No. 637,394. Patented Nov. 21, 1899.
J. W. LEDOUX.
FILTER.
(Application filed Nov. 19, 1898.)
(No Model.) 2 Sheets—Sheet 1.
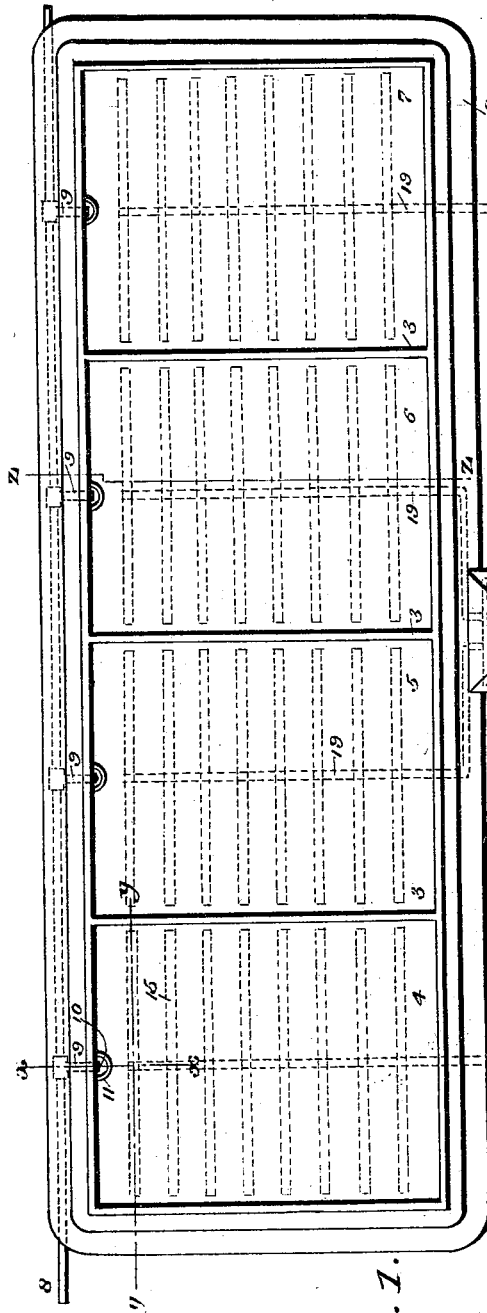
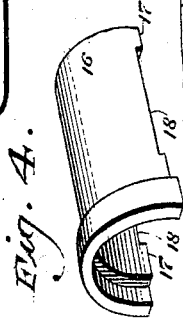
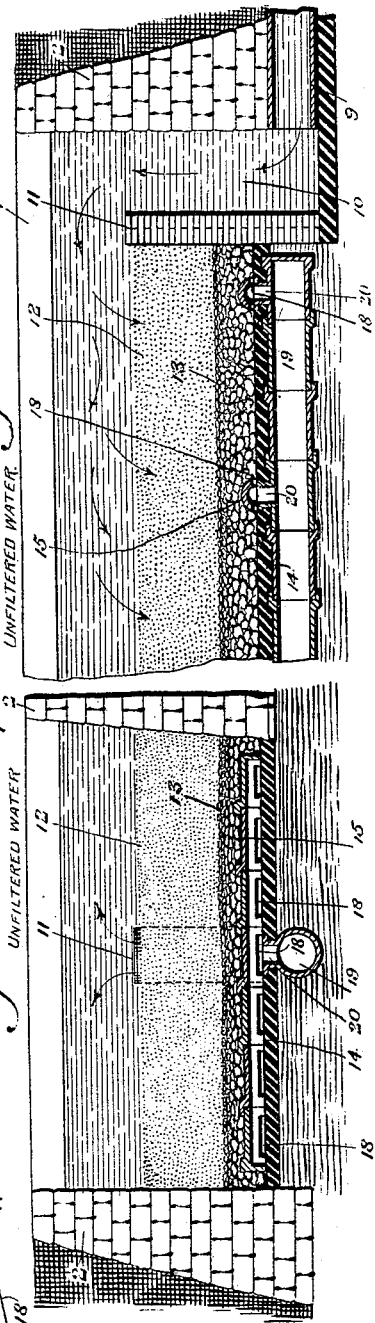

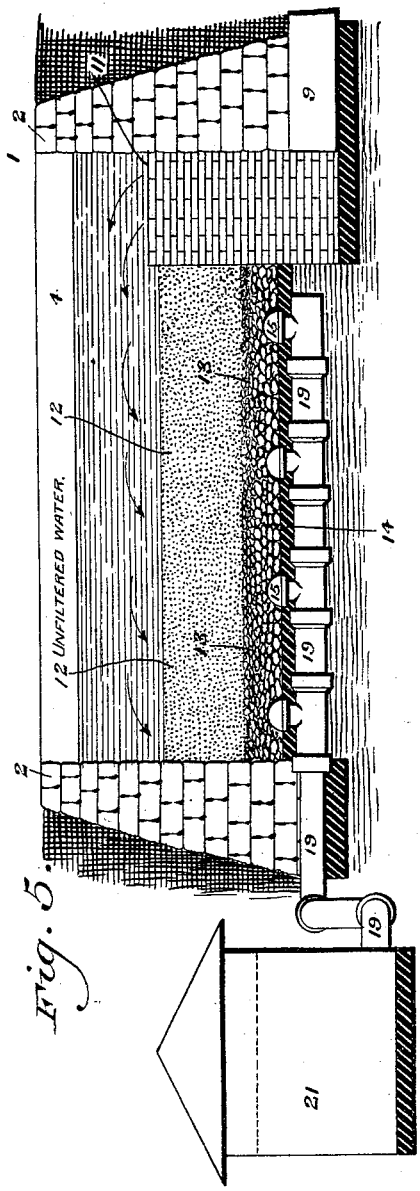
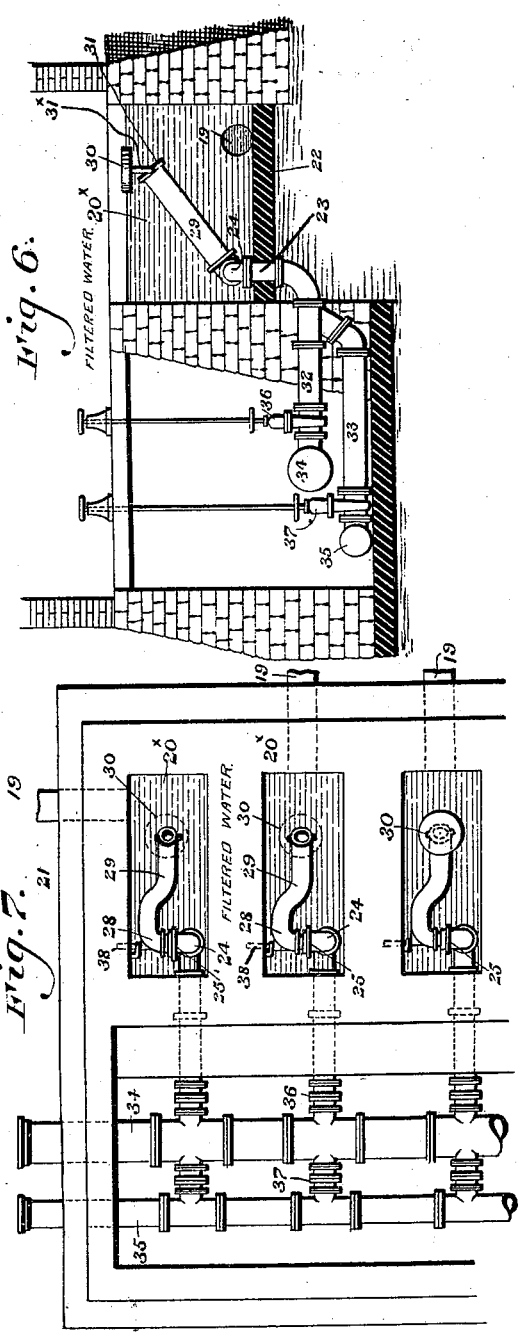
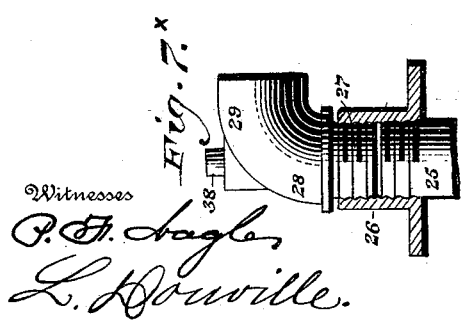

UNITED STATES PATENT OFFICE.

JOHN W. LEDOUX, OF SWARTHMORE, PENNSYLVANIA.

FILTER.

SPECIFICATION forming part of Letters Patent No. 637,394, dated November 21, 1899.

Application filed November 19, 1898. Serial No. 696,879. (No model.)

*To all whom it may concern:*

Be it known that I, JOHN W. LEDOUX, a citizen of the United States, residing at Swarthmore, in the county of Delaware, State of Pennsylvania, have invented a new and useful Improvement in Filters, which improvement is fully set forth in the following specification and accompanying drawings.

My invention consists of an improved construction of filter in which water is filtered through a sand bed, the filtered water passing thence into laterally-extending underdrains, and from the latter into a main drain and thence into a regulating-chamber, and after leaving the latter into the distribution-chamber, and thence by gravity or otherwise to the clear-water suction well or main or otherwise, as may be desired.

The invention further consists in an improved form and arrangement of the lateral and main drains, said lateral drains consisting of half-sections of pipe or tiling, which have recessed edges and are assembled as will be hereinafter explained.

It further consists of the novel combination of a bed of cement or similar material having the underdrains supported thereupon, gravel supported upon said underdrains, and sand supported on said gravel, in combination with a suitable supply-pipe whereby unfiltered water is introduced to a chamber within the filter and a centrally-located discharge-pipe for the withdrawal of the filtered water.

It further consists of novel details of construction, all as will be hereinafter fully set forth, and particularly pointed out in the claims.

Figure 1 represents a plan view of a filter embodying my invention. Fig. 2 represents a section on line $x$ $x$, Fig. 1. Fig. 3 represents a section on line $y$ $y$, Fig. 1. Fig. 4 represents, on an enlarged scale, a perspective view of one of the lateral underdrains employed, the same being shown in detached position. Fig. 5 represents a transverse view of the filter, showing the manner of withdrawing the filtered water therefrom. Fig. 6 represents a sectional view of the chamber containing the device for effecting the regulation of the flow of filtered water. Fig. 7 represents a plan view of Fig. 6. Fig. 7$^\times$ represents a plan view, partly in section, of a portion of the apparatus for automatically withdrawing the filtered water.

Similar numerals of reference indicate corresponding parts in the figures.

Referring to the drawings, 1 designates a filter plant, the same being composed of an outer wall of masonry 2, containing partitions 3, whereby the plant is divided up into a series of filter beds or chambers 4, 5, 6, and 7, the number of which can of course be increased or diminished, according to requirements, without departing from the spirit of my invention, and as the different compartments or filter-beds are substantially the same a description of one will suffice for all.

8 designates an inlet-pipe for the unfiltered water, the same entering each of the compartments by means of the branches or conduits 9 and flowing into the upright chamber 10, which latter is formed between the adjacent wall and the curved or similar shaped wall 11. The water flows upwardly and over the top of the wall 11 and mixes with the water above the sand in the main compartments of the filter, as 4, whereby it is evenly filtered and flows downwardly through the sand bed 12 and thence through the bed of gravel 13, upon which the sand is superimposed.

14 designates a bed of cement upon which the gravel 13 is supported, said cement also serving to support the lateral underdrains 15, which are made substantially as indicated in Fig. 4, and consist of the semicircular tiles 16, which are placed with their edges 17 resting on the cement bed 14, it being noted that said edges are provided with the recesses 18, (or perforations, not shown,) whereby the water after passing through the sand 12 and the gravel 13 is permitted to enter the series of lateral drains 15, which are arranged in suitable number and position, joined together and also kept in place by means of cement, as will be noted from Fig. 3, and it will be seen that the water which enters through the recesses 18 will be in purified and filtered condition.

19 designates the main drains, into which empty the lateral drains 15 at the points 20, it being seen that each of the filter beds or compartments 4, 5, 6, and 7 are provided with the main drains 19, into which empty the drains 15, whereby the water in a filtered condition is conducted to the chambers 20<sup>×</sup> of the regulating apparatus 21, which may be provided with a suitable roof or casing, as is evident. Each of the chambers 20<sup>×</sup> is provided with a base 22, through which passes the pipe 23, the latter having secured thereto an elbow 24, which has the nipple or extension 25 in engagement therewith, said nipple being in threaded engagement with the brass or composition-metal coupling 26, which is engaged by the brass or composition-metal nipple 27, which is secured to the elbow 28, from which extends the swinging pipe-section 29, which has the float 30 attached thereto by means of the connection 31<sup>×</sup>, wherefrom it will be evident that the extremity 31 of the pipe 29 will by reason of the float 30 always be retained at a certain predetermined position below the level of the filtered water in the well or chamber 30, said water flowing through said pipe 29, the pipe 23, and thence through the pipes 32 or 33 to the mains 34 and 35, the passage of water to said mains being controlled when necessary by means of the gates 36 and 37, respectively.

38 designates a journal or trunnion which is attached to the elbow 28 and rests in a suitable bearing, whereby part of the strain is taken off the coupling 26, the latter and the nipple 27 always being freely movable relative to each other, since they are made of non-corrodible material.

The operation is as follows: The incoming water is introduced into the different compartments of the filter plant through the medium of the pipe 8 and the branches 9 leading therefrom, it being important that the water should flow through every part of the filter at a uniform rate, and I have found by practice that it is desirable to have the required thickness of sand resting on a perfectly porous base, through which all the filtered water will percolate and finally reach the main outlet. The water flows downward through the sand 12 and gravel 13 of the lateral drains 15, thence to the main drains 19 and to the filtered-water compartments 20<sup>×</sup>.

The best results are obtained by supporting the lateral drains on a bed of cement, although this is not absolutely essential in every case. The joints between the tiles 16, composing the lateral drains 15, are filled with cement, so that no sand can enter except at the bottom recesses 18 provided, and the ends of said drains are closed, as seen in Figs. 3 and 5. A minimum quantity of gravel will hence be required, as is evident.

By the above construction it will be noted that the sand cannot reach the interior of the drain, as it would if the openings in the drain were on top, as is customary. I also desire to call special attention to the employment of the half-tiles (seen in Fig. 4) for the lateral drains, the same being cheaply assembled and connected or arranged substantially as explained.

I can, if desired, use half-tiles laid on projections of mortar, leaving a space at the bottom for water to enter; but in either case the water passes downwardly through the sand, thence to the gravel to the bottom of the drains, where it enters and passes along on the cement surface to the main drains 19 and thence to the regulating-chambers 20<sup>×</sup>, substantially as has been explained. While it is preferable to have the gravel bed continuous between adjacent lateral drains, the construction can be simplified and cheapened by merely piling gravel around each drain and filling intervening space with sand.

In a sand-filter it is important that the rate of filtration be uniform at all times, and in order that no sudden changes of said rate occur I employ the apparatus seen in Figs. 6 and 7. By the function of the swinging pipe 29 and the float 30, attached thereto, it will be seen that said pipe will be elevated and freely movable in all its positions, while the float 30 remains at a fixed or adjustable distance from the inlet-opening in the pipe, thus accomplishing the object of securing a submerged orifice having a constant head, and hence constant rate of flow. The construction of the joints, whereby said pipe 29 is permitted to swing or oscillate through its arc, will be understood from Figs. 6, 7, and 7<sup>×</sup>, certain parts being omitted from Fig. 7 which are clearly shown in Fig. 7<sup>×</sup>.

It will be apparent that leakage is reduced to a minimum by the employment of the threaded joint and its adjuncts, and, if desired, the float 30 can be counterbalanced if necessary.

If desired, the inlet-opening of the swinging pipe 29 can be provided with an elbow, so that the plane of the opening can revolve in a direction parallel to the plane of rotation. The swinging pipe 29 is in practice a galvanized or other light pipe, and by the employment of the brass or composition-metal coupling and nipple its rotation or oscillation readily occurs with a minimum friction, and rusting of the working joint is obviated.

In filtering water through a sand bed the top surface of the sand gradually clogs up, due to the deposition of sediment and other material, and consequently the rate of filtration through the sand is proportionate to the difference of level between the water over the sand bed and the water in the regulating-chamber. As the rate of flow through the submerged orifice of the pipe 29 is constant when once the length of chain connection 31<sup>×</sup> is properly adjusted, the level of the water in the regulating-chamber 20<sup>×</sup> will lower as the rate of filtration through the sand bed becomes less. As the water-level falls it will carry the float and the submerged orifice of the pipe 29 with it, whereby the differences in level between the water and the filter basin or beds 4, 5, 6, or 7 and the regulating-chamber will automatically be changed, so as to maintain a constant rate of filtration as the sand bed 12 gradually becomes clogged.

Having thus described my invention, what I claim as new, and desire to secure by Letters Patent, is—

1. In a filter, a lateral drain for the withdrawal of filtered water, the same being composed of curved or segmental sections of tiling, the same being recessed or perforated at or near their bottom edges, said sections being arranged in continuous series, and the end sections of the drain having their outer extremities closed.

2. In a filter, a cement bed, a longitudinal main drain thereunder, a series of lateral drains supported upon said bed, and having recessed or perforated edges and closed ends, a layer of gravel above said lateral drains and a layer of sand supported upon said gravel.

3. A filter plant consisting of a series of compartments, an inlet leading to the inner portion thereof, a series of lateral drains in said compartments, said drains being composed of a series of sections of tiling arranged in continuous order and having recessed edges, a bed supporting said drains, gravel surrounding said drains and supported upon said bed, sand supported above said gravel and a series of main drains communicating with said lateral drains.

4. The combination of a filter and a chamber for the reception of filtered water therefrom, said chamber containing an outlet-pipe, an elbow connected therewith, a nipple engaging said elbow, a non-corrodible coupling engaging said nipple, a non-corrodible nipple engaging said coupling, a swinging pipe attached to said nipple, a float and a connection common to said pipe and float.

5. In a filter, a chamber for the reception of filtered water, an outlet-pipe in said chamber, an elbow connected therewith, a nipple engaging said elbow, a coupling engaging said nipple, a second nipple engaging said coupling, a swinging pipe engaging one of said nipples, a trunnion on said elbow located opposite to said coupling, a float and a connection from the latter to said swinging pipe.

6. The combination of a plurality of filtering-compartments, means for conveying water therefrom to a series of wells for the reception of filtered water, regulating devices having a submerged orifice located in each of said wells and outlet-pipes leading from said devices.

7. In a filter, a bed, a drain supported thereupon and composed of segmental sections of tiling, having openings near their bottom edges, said sections being arranged in continuous series and the outer sections having closed ends, gravel surrounding said drain and supported upon said bed, a layer of sand supported upon said gravel and means for withdrawing the filtered water.

8. A plurality of filtering-compartments, means for conveying water therefrom, a series of wells, regulating devices having a submerged orifice located in each of said wells, an outlet-pipe leading from said devices, said outlet-pipe being provided with the branches 32 and 33, which lead to mains 34 and 35 and valves 36 and 37 located in said branches.

JOHN W. LEDOUX.

Witnesses:
JOHN A. WIEDERSHEIM,
E. HAYWARD FAIRBANKS.